United States Patent [19]

Collignon

[11] Patent Number: 5,085,135
[45] Date of Patent: Feb. 4, 1992

[54] COFFEE MAKER BREW POT VALVE APPARATUS

[76] Inventor: Gary E. Collignon, P.O. Box 258, Tahoe City, Calif. 95730

[21] Appl. No.: 553,257

[22] Filed: Jul. 16, 1990

[51] Int. Cl.⁵ .............................................. A47J 31/02
[52] U.S. Cl. ................................... 99/299; 99/295; 99/304; 141/344; 251/95; 251/113; 251/331
[58] Field of Search ............. 99/295, 299, 300, 302 R, 99/304, 306, 279; 251/95, 113, 331; 426/433; 141/344, 345

[56] References Cited

U.S. PATENT DOCUMENTS

| 1,379,927 | 5/1921 | Kneass | 251/95 |
| 3,987,716 | 10/1976 | Lorang | 99/282 X |
| 4,630,532 | 12/1986 | Sonnentag et al. | 99/306 X |
| 4,714,011 | 12/1987 | Ly | 99/293 X |
| 4,728,281 | 3/1988 | McGuffin et al. | 99/279 X |
| 4,798,222 | 1/1989 | Kauffman | 99/279 X |
| 4,811,657 | 3/1989 | Rixen | 99/295 |
| 4,893,552 | 1/1990 | Wunder et al. | 99/299 |
| 4,969,392 | 11/1990 | Steele et al. | 251/331 X |

FOREIGN PATENT DOCUMENTS

| 0327181 | 8/1989 | European Pat. Off. | 99/279 |
| 2621025 | 12/1977 | Fed. Rep. of Germany | 99/295 |
| 2732053 | 2/1979 | Fed. Rep. of Germany | 99/295 |
| 3408247 | 5/1985 | Fed. Rep. of Germany | 99/279 |
| 408327 | 1/1910 | France | 251/331 |
| 429244 | 7/1911 | France | 251/331 |
| 2620612 | 3/1989 | France | 99/295 |
| 314610 | 6/1934 | Italy | 251/331 |
| 7706110 | 12/1978 | Netherlands | 99/306 |
| 2650 | of 1854 | United Kingdom | 251/331 |
| 4642 | of 1902 | United Kingdom | 141/344 |
| 2063655 | 6/1981 | United Kingdom | 99/295 |

Primary Examiner—Philip R. Coe
Assistant Examiner—C. Cooley
Attorney, Agent, or Firm—Leon Gilden

[57] ABSTRACT

An apparatus wherein a coffee maker includes a brew pot formed with a conical upper chamber and a cylindrical lower chamber, wherein the cylindrical lower chamber includes a valve member cooperative with the lower chamber to selectively disrupt and discontinue flow therethrough. The valve member cooperates with a concave deflectable plate mounted therein to receive a shaft to overlie and deflect the plate to disengage flow to a lower conduit formed within the lower chamber.

4 Claims, 4 Drawing Sheets

PRIOR ART

FIG. 5
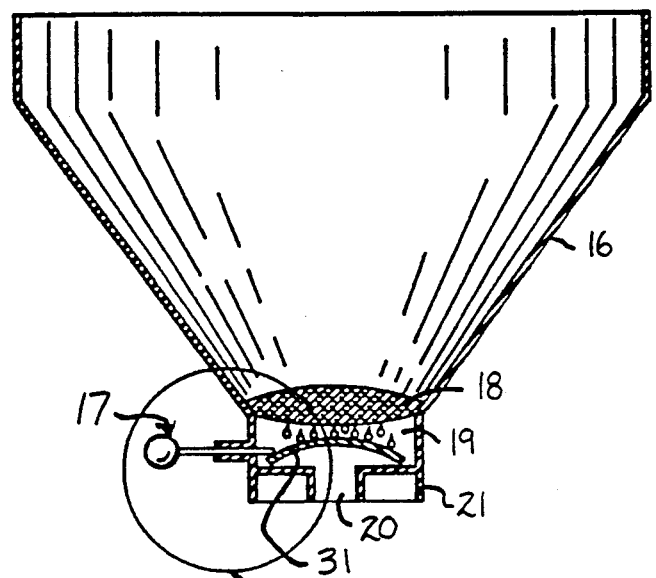
FIG. 6
FIG. 6
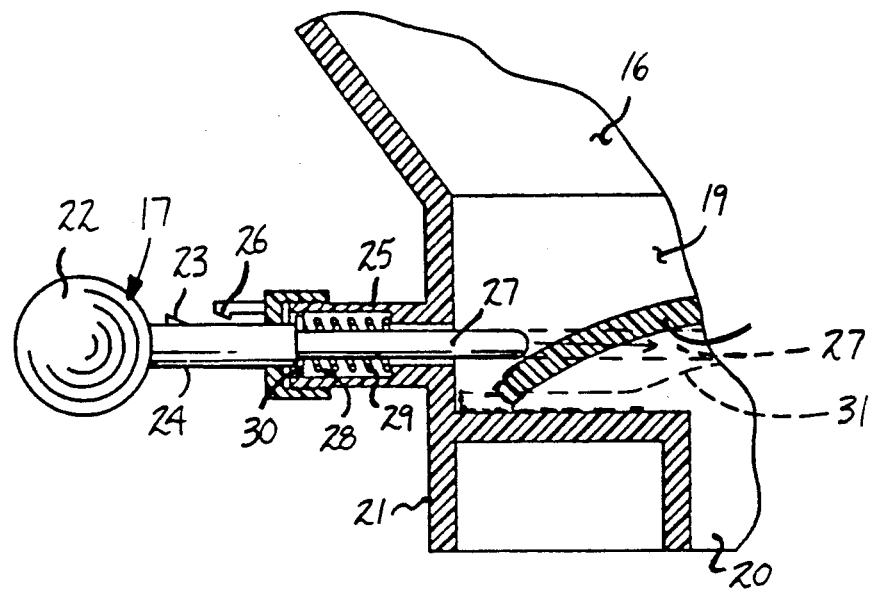

COFFEE MAKER BREW POT VALVE APPARATUS

BACKGROUND OF THE INVENTION

1. Field of the Invention

The field of invention relates to coffee maker apparatus, and more particularly pertains to a new and improved coffee maker valve apparatus wherein the same permits selective discontinuing flow of coffee through an associated brew pot to an underlying container.

2. Description of the Prior Art

It is frequently desirable during the brewing of coffee by contemporary coffee makers to disrupt flow to permit individuals to remove an associated underlying container for purposes of serving from the container or alternatively filling a single cup from an underlying position relative to the brew pot. Prior art apparatus has not adequately addressed this problem in a convenient and compact organization as set forth by the instant invention. Prior art coffee makers may be found in U.S. Pat. No. 3,987,716 to Lorang setting forth a conventional coffee maker organization including a top member and a central support column containing a heating chamber to direct heated water through the top and through a brew pot in a conventional manner, wherein the operation of the Lorang patent is incorporated herein by reference for setting forth operation of a coffee brewing organization.

U.S. Pat. No. 4,728,281 to McGuffin, et al. sets forth a beverage making organization utilizing a lid selectively securable overlying the operating components of the organization in cooperation with a key lock arrangement to permit selective access thereto.

U.S. Pat. No. 4,798,222 to Kauffman provides a brew pot and valve assembly to include a siphon flow of fluid therethrough.

U.S. Pat. No. 4,714,011 to Ly sets forth a brewing apparatus to be selectively utilized with prepackaged water utilizing a puncturing means for puncturing a prepackaged water container.

U.S. Pat. No. 4,630,532 to Sonnentag, et al. provides a brewing organization utilizing a side-by-side arrangement to permit securement of the organization underlying cabinetry within a conventional kitchen arrangement.

As such, it may be appreciated that there continues to be a need for a new and improved coffee maker valve apparatus wherein the same addresses both the problems of ease of use as well as effectiveness in construction and in this respect, the present invention substantially fulfills this need.

SUMMARY OF THE INVENTION

In view of the foregoing disadvantages inherent in the known types of coffee maker apparatus now present in the prior art, the present invention provides a coffee maker valve apparatus wherein the same permits selective disruption of flow through a brew pot permitting removal of an underlying container. As such, the general purpose of the present invention, which will be described subsequently in greater detail, is to provide a new and improved coffee maker valve apparatus which has all the advantages of the prior art coffee maker apparatus and none of the disadvantages.

To attain this, the present invention provides an apparatus wherein a coffee maker includes a brew pot formed with a conical upper chamber and a cylindrical lower chamber, wherein the cylindrical lower chamber includes a valve member cooperative with the lower chamber to selectively disrupt and discontinue flow therethrough. The valve member cooperates with a concave deflectable plate mounted therein to receive a shaft to overlie and deflect the plate to disengage flow to a lower conduit formed within the lower chamber.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved coffee maker valve apparatus which has all the advantages of the prior art coffee maker apparatus and none of the disadvantages.

It is another object of the present invention to provide a new and improved coffee maker valve apparatus which may be easily and efficiently manufactured and marketed.

It is a further object of the present invention to provide a new and improved coffee maker valve apparatus which is of a durable and reliable construction.

An even further object of the present invention is to provide a new and improved coffee maker valve apparatus which is susceptible of a low cost of manufacture with regard to both materials and labor, and which accordingly is then susceptible of low prices of sale to the consuming public, thereby making such coffee maker valve apparatus economically available to the buying public.

Still yet another object of the present invention is to provide a new and improved coffee maker valve apparatus which provides in the apparatuses and methods of the prior art some of the advantages thereof, while simultaneously overcoming some of the disadvantages normally associated therewith.

Still another object of the present invention is to provide a new and improved coffee maker valve apparatus wherein the same provides a brew pot and associated valve member to selectively arrest flow of a coffee beverage through the brew pot assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an orthographic view, taken along the lines 5—5 of FIG. 4, in the direction indicated by the arrows.

FIG. 6 is an orthographic cross-sectional illustration of the section 6 as set forth in FIG. 5.

DESCRIPTION OF THE PREFERRED EMBODIMENT

Figure 1:
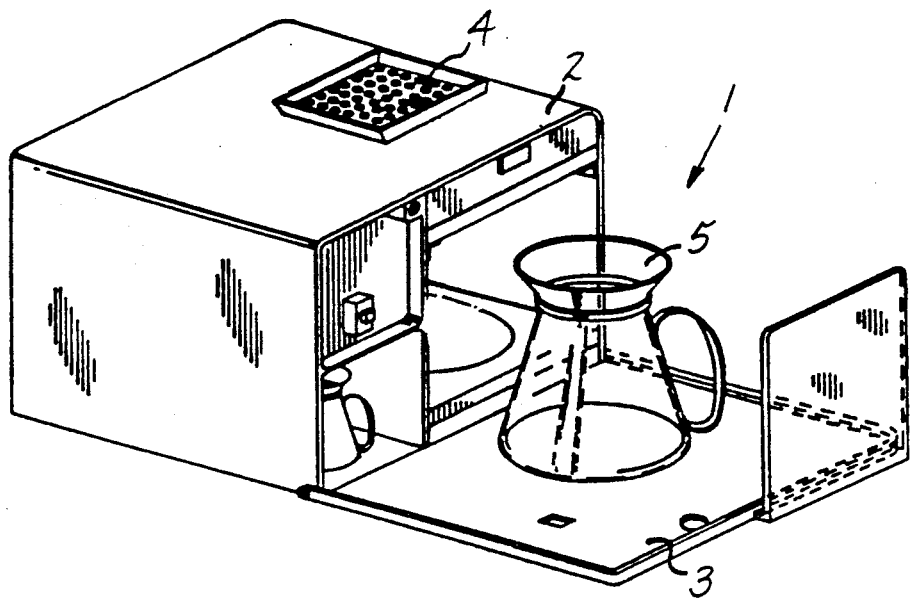
FIG. 1 is an isometric illustration of a prior art coffee maker apparatus.

With reference now to the drawings, and in particular to FIGS. 1 to 8 thereof, a new and improved coffee maker valve apparatus embodying the principles and concepts of the present invention and generally designated by the reference numeral 10 will be described.

Figure 2:
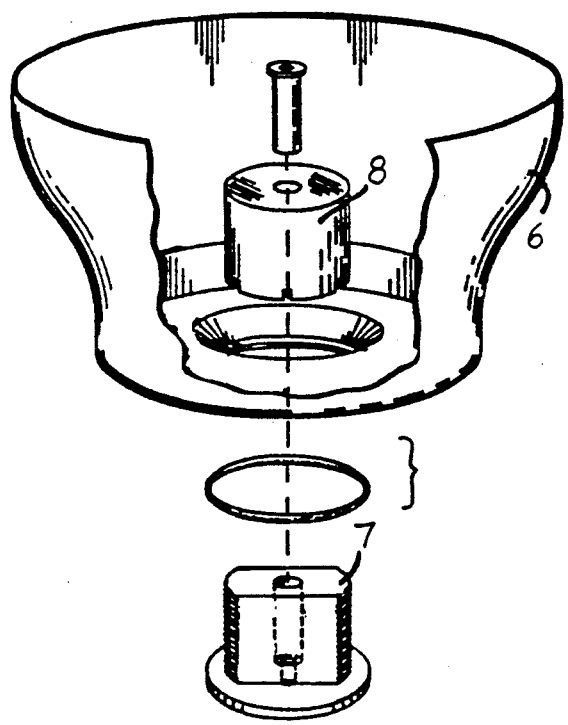
FIG. 2 is an isometric illustration of a prior art brew pot and valve organization.
Figure 3:
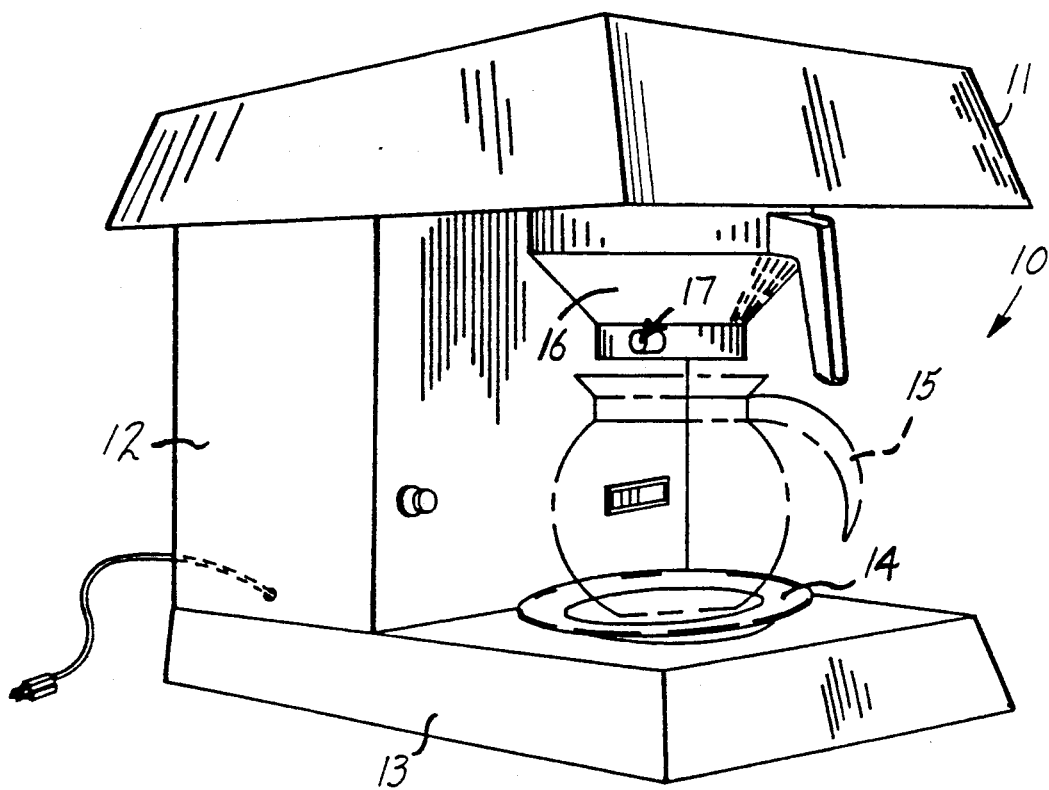
FIG. 3 is an isometric illustration of the instant invention.
Figure 4:
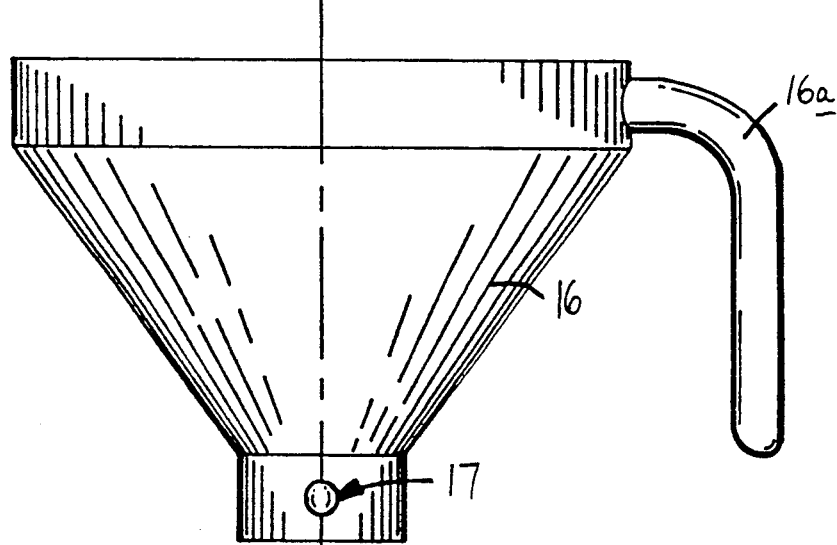
FIG. 4 is an orthographic side view, taken in elevation, of the brew pot of the instant invention.

FIG. 1 illustrates a prior art coffee maker arrangement 1, wherein a housing 2 includes a lid 3 securable to a forward face of the housing to overlie a forward face and an asssociated fluid receiving entrance 4 to provide selective access to the organization for use. FIG. 2 illustrates a brew pot organization 6, wherein a valve includes an upper valve member 8, including slots to direct fluid flow to an underlying valve member 7 in a siphoning arrangement relative to fluid flow therethrough.

More specifically, the coffee maker valve apparatus 10 of the instant invention essentially comprises a housing top 11 mounted to a support column 12 and underlying base 13. A stove plate 14 is positioned on the base 13 to underlie and provide selective heating to a container 15, in a manner as set forth and exemplified in U.S. Pat.No. 3,987,716 incorporated herein by reference. The container 15 underlies a brew pot 16 mounted selectively to the housing top 11 to direct fluid flow of water and a coffee mixture within an upper conical portion of the brew pot 16. A cylindrical brew pot lower chamber 21 mounts a valve member 17 therewithin to selectively effect discontinuance of flow through the brew pot 16. The valve member 17 is mounted to cooperate with a central flow cavity 19 positioned within the lower chamber 21. The lower chamber 21 includes an output conduit 20 coaxially aligned with the brew pot 16 and the central flow cavity 19. A filtration member 18 overlies the central flow cavity 19, with an arcuate concave deflecting plate 31 overlying the output conduit 20, in a manner as illustrated in FIGS. 5 and 6.

The valve member 17 includes a handle 22 integrally mounted to a first shaft 24 of a first diameter that is coaxially and integrally mounted to a forwardly extending second shaft 27 in a second diameter less than that of the first diameter. The second shaft 27 extends interiorly of the flow cavity 19 and spaced from the deflector plate 31 in a first position and engaged with to overlie and deflect the deflector plate 31 downwardly to engage interior side walls of the cavity 19 to overlie and disrupt and disengage fluid through the output conduit 20 in the second position when the handle 22 is projected forwardly. The first and second shafts 24 and 27 are coaxially aligned and coaxially mounted within a valve boss 25, wherein the valve boss 25 includes a valve boss cavity 28 of a generally cylindrical configuration capturing a spring 29 within the cavity 28. An adjustment plate 30 is positioned in abutment against a shoulder defined between the second shaft 27 and the first shaft 24 to capture the spring 29 between the plate 30 and a forward stepped surface of the cavity 28. An engagement rib 23 integrally mounted to the first shaft 24 includes a forward sloping surface cooperative with a rearwardly sloping surface formed with an "L" shaped engagement foot 26 mounted to the valve boss 25 to lock the first and second shafts 24 and 27 in the forward second position. Simple rotation of the shaft 24 by the handle 22 permits disengagement of the rib 23 relative to the engagement foot 26 to effect disengagement of the second shaft 27 from an overlying relationship relative to the deflector plate 31. The deflector plate 31 formed of a memory retentent deformable material will then spring-back into a first position to again permit flow through the central flow cavity 19 and the output conduit 20.

Figure 7:
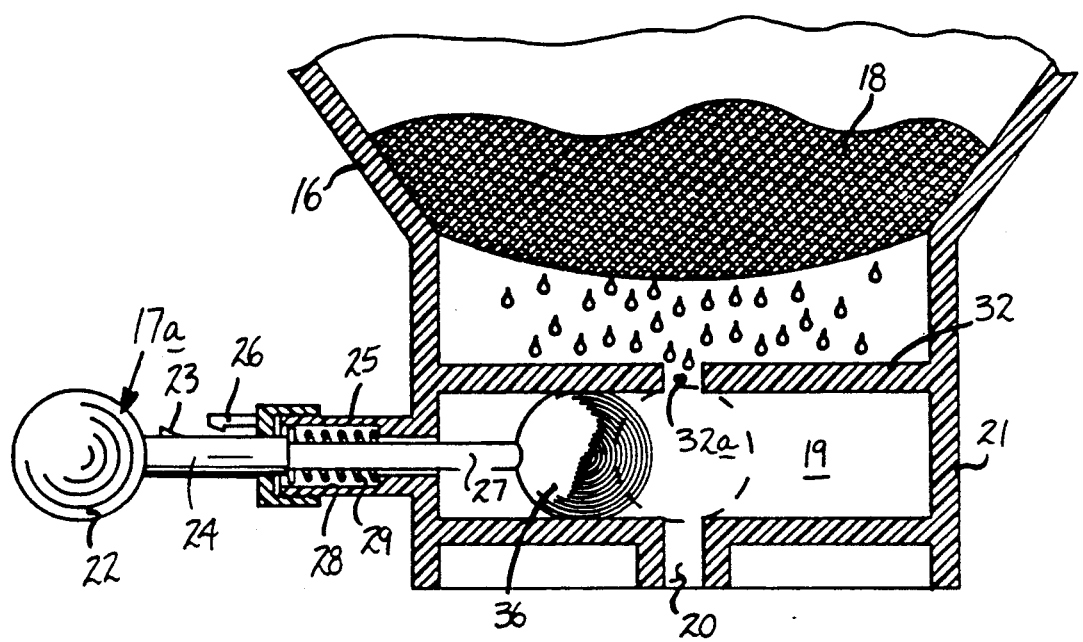
FIG. 7 is an orthographic cross-sectional illustration of a modified valve member as utilized by the instant invention.
Figure 8:
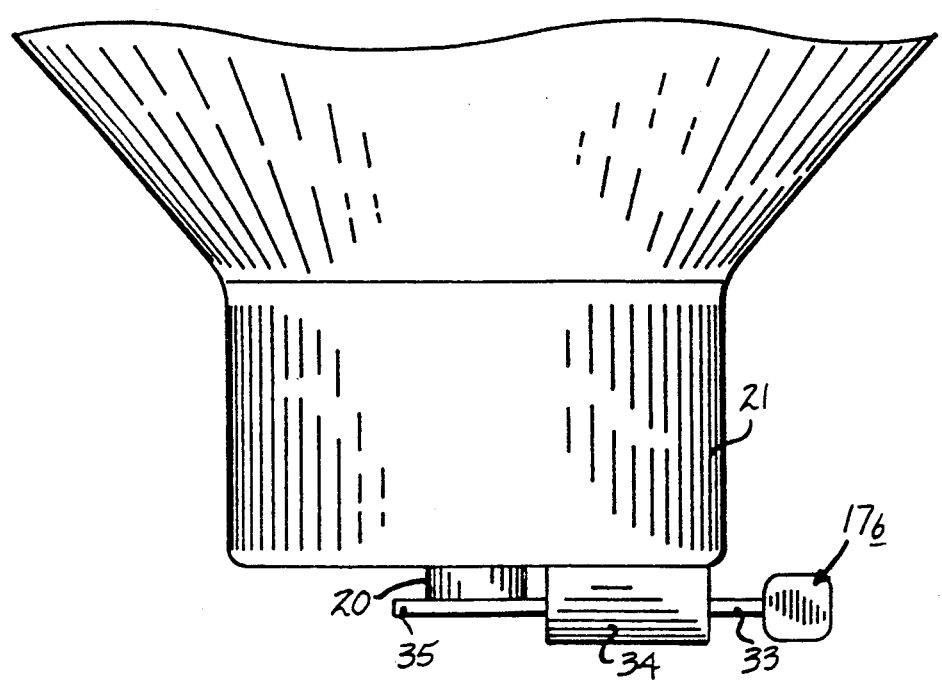
FIG. 8 is an orthographic side view, taken in elevation, of a further modified valve member as utilized by the instant invention.

FIG. 7 illustrates a modified valve 17a, wherein the second shaft 27 includes a valve sphere 36 mounted coaxially with the second shaft 27. The flow cavity 19 includes a roof 32 positioned overlying a floor of the flow cavity to define a flow cavity conduit 32a directed therethrough in coaxial alignment with the output conduit 20. A spacing defined between the roof 32 and the floor of the cavity 19 is substantially equal to a diameter defined by the valve sphere 36. FIG. 8 illustrates the use of a further valve member 17b, wherein a support shaft 33 mounts a flow plate 35 at a forwardmost end thereof to overlie the output conduit 20, wherein the shaft 33 is mounted within a support housing 34.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A coffee maker valve apparatus in combination with a coffee maker, including a housing top, a support column mounted to the housing top, and a base, the base underlying a brew pot, the brew pot selectively mounted to the housing top, and the brew pot including an upper longitudinally aligned section and a lower longitudinally aligned section, wherein the upper and lower sections are coaxially aligned relative to one another, and the lower section defined by a cylindrical housing, the cylindrical housing including a central flow cavity underlying the upper section, and the central flow cavity overlying an output conduit, and a valve member reciprocally mounted within the central flow cavity, and wherein the central flow cavity includes a convex deflector plate overlying the output conduit, the deflector plate formed of a memory retentent deformable material, and wherein the valve member is cooperative with the deflector plate, wherein the valve member is spaced from the deflector plate in a first position and is engaged with the deflector plate in a second position to depress the deflector plate to effect overlying sealing of the output conduit preventing fluid flow therethrough, and wherein the valve member includes a valve boss integrally and orthogonally mounted within the central flow cavity, the central flow cavity defining a cylindrical lower chamber, and the valve member further including a first shaft reciprocally and coaxially directed through the valve boss, the first shaft defined by a first diameter, and a second shaft integrally and coaxially mounted to a forward end of the first shaft, wherein the second shaft extends interiorly of the flow cavity, and a spring member mounted within the boss and captured between the first shaft and the lower chamber to bias the first and second shaft rearwardly to the first position.

2. An apparatus as set forth in claim 1 wherein the valve boss includes a valve boss cavity, the valve boss cavity mounting the spring therewithin, and the second shaft directed through the valve boss cavity coaxially aligned therewith to extend into the flow cavity.

3. An apparatus as set forth in claim 2 wherein the first shaft includes an engagement rib, the engagement rib including a sloping forward surface, and the valve boss including an "L" shaped engagement foot including a rearwardly sloped surface cooperative with the forwardly sloped surface of the engagement rib to lock the engagement rib relative to the engagement foot in the second position.

4. An apparatus as set forth in claim 3 wherein the first shaft includes a handle integrally mounted to a rear terminal end of the first shaft rearwardly of the engagement rib, and the handle, the first shaft, the second shaft, and the engagement rib are rotatable to disengage the engagement rib relative to the engagement foot to permit retraction of the second shaft to the first position.

* * * * *